United States Patent [19]

Forrest, Jr.

[11] Patent Number: 5,416,959
[45] Date of Patent: May 23, 1995

[54] TENTER CLIPS FOR USE IN STRETCHING THERMOPLASTIC FILM IN A TENTER FRAME

[75] Inventor: Albert W. Forrest, Jr., Chillicothe, Ohio

[73] Assignee: E. I. Du Pont de Nemours and Company, Wilmington, Del.

[21] Appl. No.: 203,249

[22] Filed: Mar. 1, 1994

[51] Int. Cl.⁶ .................. D06C 3/00; D06C 3/04
[52] U.S. Cl. ........................ 26/73; 69/19.3; 38/102.1; 24/68 D
[58] Field of Search .......... 69/19.3; 38/102.1; 26/73, 51; 254/250, 251; 24/68 A, 68 D, 134 R

[56] References Cited

U.S. PATENT DOCUMENTS

| | | | |
|---|---|---|---|
| 1,438,955 | 12/1922 | Gilmore | 254/251 |
| 1,809,400 | 6/1931 | Bulkeley | 69/19.3 |
| 2,159,776 | 5/1939 | Barozzi | 69/19.3 |
| 2,622,844 | 12/1952 | Abbott | 254/250 |
| 3,150,433 | 9/1964 | Kampf | 26/57 |
| 3,172,151 | 3/1965 | Glossmann | 26/73 |
| 3,305,889 | 2/1967 | Lewis et al. | 18/1 |
| 3,391,421 | 7/1968 | D'Onofrio | 26/73 |
| 3,890,421 | 6/1975 | Habozit | 264/289 |
| 4,637,103 | 1/1987 | Hutzenlaub | 26/73 |
| 4,853,602 | 8/1989 | Hommes et al. | 318/38 |
| 4,890,365 | 1/1990 | Langer | 26/73 |

FOREIGN PATENT DOCUMENTS

| | | | |
|---|---|---|---|
| 1214390 | 4/1966 | Germany | 26/73 |
| 2825210 | 12/1979 | Germany | 26/73 |

Primary Examiner—John J. Calvert

[57] ABSTRACT

A tenter clip is provided for gripping a web of thermoplastic film between the curved surface of a toggle arm and an anvil surface which is tapered at each of its ends. The surface configurations of the toggle arm and anvil define effective surfaces for gripping the film while allowing the film to stretch under these surfaces. Beads are formed at the edges of the web during stretching. These beads wedge into substantially V-shaped gripping regions defined by the toggle arm and anvil to assist in the stretching operation.

9 Claims, 4 Drawing Sheets

TENTER CLIPS FOR USE IN STRETCHING THERMOPLASTIC FILM IN A TENTER FRAME

BACKGROUND OF THE INVENTION

1. Field of the Invention

The field of art to which this invention pertains is tenter clips.

More specifically, this invention involves a tenter clip which may be used to simultaneously stretch a web of film biaxially in the machine and cross-machine directions in a tenter frame. The clip consists of an anvil and a pivotable toggle arm with a curved gripping surface. When the toggle arm is pivoted into its operative position, the web is effectively gripped between this surface and a gripping surface of the anvil. The portions of the anvil surface adjacent this gripping surface are tapered. The surface configurations of the anvil and toggle arm are such as to permit the web to stretch out from beneath the gripping surfaces during the biaxial stretching operation.

In another more comprehensive embodiment, this invention is a tenter frame for stretching film using a plurality of these clips. The gripping surfaces of such clips have a longitudinal dimension in the machine direction which is less than the distance between the centers of the spaced clips, in their startup positions prior to stretching, to permit effective biaxial stretching to take place. The ratio of the longitudinal dimension of the gripping surfaces of the clips to the spacing distance between the center of the clips is between 0.1 and 0.6 and, preferably, between 0.2 and 0.35.

2. Description of the Related Art

It is well known in the art to use tenter clips having a shaped gripping surface for gripping a web of film during a biaxial stretching operation in a tenter frame.

Typical examples of such clips are seen in U.S. Pat. Nos. 3,305,889 to Lewis et al; 3,150,433 to Kampf; 3,391,421 to D'Onofrio; and 3,890,421 to Habozit. In these patents the gripping surface of the pivotable clamping member has a curved configuration; however, the flat gripping surface of the anvil limits the ability of the film to stretch smoothly biaxially in the machine and cross-machine directions under such gripping surfaces during stretching.

In the clip of the present invention the gripping surface of the anvil is comparatively narrow in width and has tapered surfaces at each of its edges. These features have been found not only to improve the stretching step but as the web stretches under the gripping surfaces, and decreases in thickness, the curved surface of the toggle arm and tapered surface of the anvil adjacent the edge of the web form a gripping means or region for gripping the bead which forms at the web edge, during stretching. This bead as it wedges in this substantially V-shaped gripping region enables the clip to carry most of the stretching forces and helps prevent undue stress concentrations and tears in the film during stretching.

It further has been found important to limit the longitudinal dimension of the gripping surface of each clip in the machine direction so that it is less than the distance between the centers of the spaced clips, at startup and prior to and during the stretching operation. By limiting the ratio of gripping surface length to the spacing distance between clips, more effective stretching between such clips is accomplished, particularly in the machine direction.

The present invention, using tenter clips as described above, accordingly provides an effective means for improving the stretching of a thermoplastic film biaxially in a tenter frame over that seen in the prior art. The web stretches more smoothly with less stress being placed on the web, and with fewer tears.

Summary of the Invention

Briefly described this invention is a tenter clip for use in stretching a web of sheet material in a tenter frame.

Such clip comprises a toggle arm and an anvil. The toggle arm is pivotably connected to a carriage and the anvil is fixedly connected to the carriage.

The toggle arm has a curved surface at one end in both the machine and cross-machine directions, a portion of which forms a first gripping surface which is adapted to contact a first upper surface of the web. A surface of the anvil faces the curved surface of the toggle arm and a portion of this anvil surface forms a second gripping surface which is adapted to contact a second lower surface of the web. This second gripping surface combines with the first gripping surface of the toggle arm to grip the web therebetween when the first gripping surface is pivoted into contact with the first upper surface of the web.

Portions of the anvil surface are tapered. This feature, along with the curved surface of the toggle arm, not only defines the area of the web in contact with the first and second gripping surfaces for effective gripping but further allows the web to stretch out more freely from between these gripping surfaces during a stretching operation.

More specifically, the anvil has a first tapered surface connected to its gripping surface. This tapered surface extends downwardly and below the body of a web being gripped. A second tapered surface is also connected to the anvil gripping surface. It extends downwardly and below the edge of the web being gripped whereby when the web stretches out from under the first and second gripping surfaces, and thereby decreases in thickness, during a web stretching operation, a gripping bead is formed at the edge of the web which wedges in a gripping region behind the first and second gripping surfaces to enable the web to be stretched smoothly without undue stress concentrations or film tears in such web during stretching.

Generally, the first tapered surface of the anvil extends downwardly and below the body of a web being gripped at an angle of between 5° to 60° from the horizontal. The second tapered surface also extends downwardly and below the edge of the web being gripped typically at an angle of between 5° to 60° from the horizontal. Preferably the first and second tapered surfaces of the anvil extend downwardly at an angle of about 20° from the horizontal.

The clip of this invention is specifically adapted to grip a web of film during a simultaneous biaxial stretching operation.

The first and second gripping surfaces of the clip define a web contact area in their web gripping positions. Preferably, the longitudinal dimension of such contact area is such as to permit free longitudinal movement of the web as it is stretched between adjacent clips.

In another embodiment of this invention, a plurality of spaced apart tenter clips are provided which are adapted to grip a web of sheet material which is being stretched bi-axially in the machine and cross-machine directions during a web stretching operation. Each clip has a first and second gripping surface for gripping the web therebetween, and, importantly, the longitudinal dimension of the gripping surface of the clip in the machine direction is less than the distance between the centers of the spaced clips in this direction, prior to stretching.

More specifically, the ratio of the longitudinal dimension of the gripping surface of each clip and the spacing distance between the clips is between 0.1 and 0.6 Preferably such ratio is between 0.2 and 0.35. By maintaining the ratio within these limits, thin spots in the film are less likely to occur and film breaks are thereby avoided.

In a more specific embodiment, this invention is a tenter clip comprising a curved toggle arm and an anvil having first and second tapered surfaces connected to a second gripping surface and extending downwardly and away from the web being gripped at angles of between 5° to 60° from the horizontal.

The second gripping surface as defined by the tapered anvil is adapted to act in combination with the curved first gripping surface of the toggle arm to firmly grip the film therebetween during stretching.

Further the curved and tapered surfaces of the toggle arm and anvil enable the film to stretch out from under the gripping area as defined by the first and second gripping surfaces, and to act so as to wedge a bead of the web being gripped in a gripping region behind a wedge point defined by a portion of the curved surface of the toggle arm and the second tapered surface of the anvil, during the stretching operation.

Lastly, this invention is a tenter frame for simultaneously stretching a web of thermoplastic film bi-axially in the machine and cross-machine directions by propelling carriages with tenter clips attached thereto at varying velocities in endless paths positioned opposite each other.

A plurality of tenter clips grip the edges of the web during its movement through the tenter frame. Each clip consists of a toggle arm which is pivotably connected to a carriage and has a curved lower first gripping surface. The clip further has an anvil, which is fixedly connected to such carriage, and which has an upper second gripping surface whereby when the toggle arm is pivoted into contact with a web, an area adjacent the edges of such web is gripped between the upper and lower gripping surfaces.

The longitudinal dimension of the gripping surfaces of each clip in the machine direction is always less than the distance between the centers of the spaced clips in this direction and the ratio of the longitudinal dimension of the gripping surface of the clips and the spacing distance between the clips is between 0.1 and 0.6 and, preferably, between 0.2 and 0.35.

DESCRIPTION OF THE PREFERRED EMBODIMENT

This invention primarily involves the use of an improved tenter clip for stretching a web of thermoplastic film in a tenter frame.

The film to be oriented may be obtained from any appropriate source, such as a supply roll for example. In the embodiment shown in FIG. 1, the film is supplied to the tenter frame in the form of a continuous web W as it emerges from a typical film production line. This is the preferred film supply source.

Figure 1:
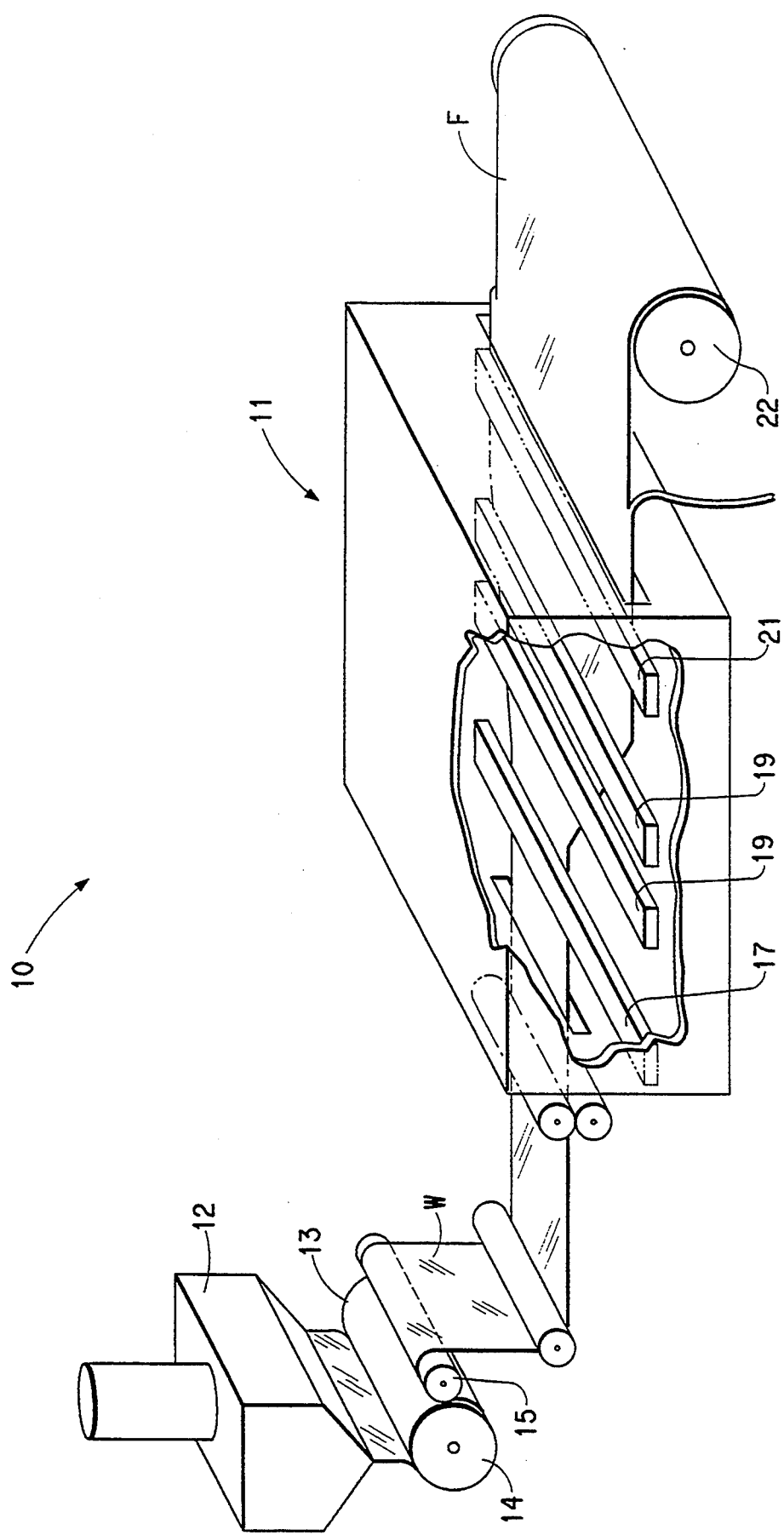
FIG. 1 is a diagrammatic view of a tenter frame suitable for biaxially stretching a web of sheet material in accordance with this invention.
Figure 2:
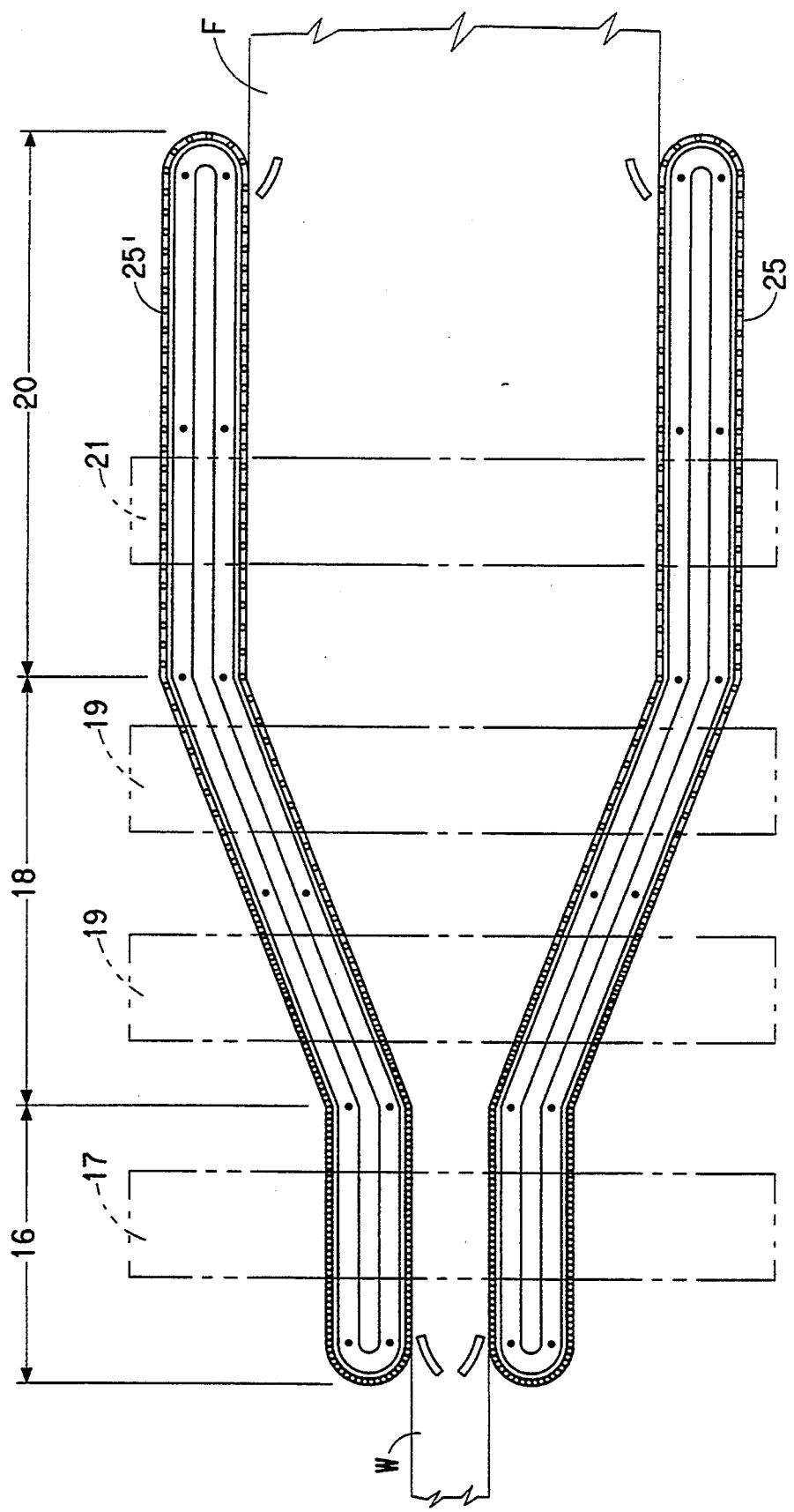
FIG. 2 is a schematic top plan view of the tenter frame shown in FIG. 1.

Referring to the drawings, FIGS. 1 and 2 show a typical apparatus 10 suitable for simultaneously stretching thermoplastic film biaxially in the machine and cross-machine directions in accordance with this invention.

Figure 3:
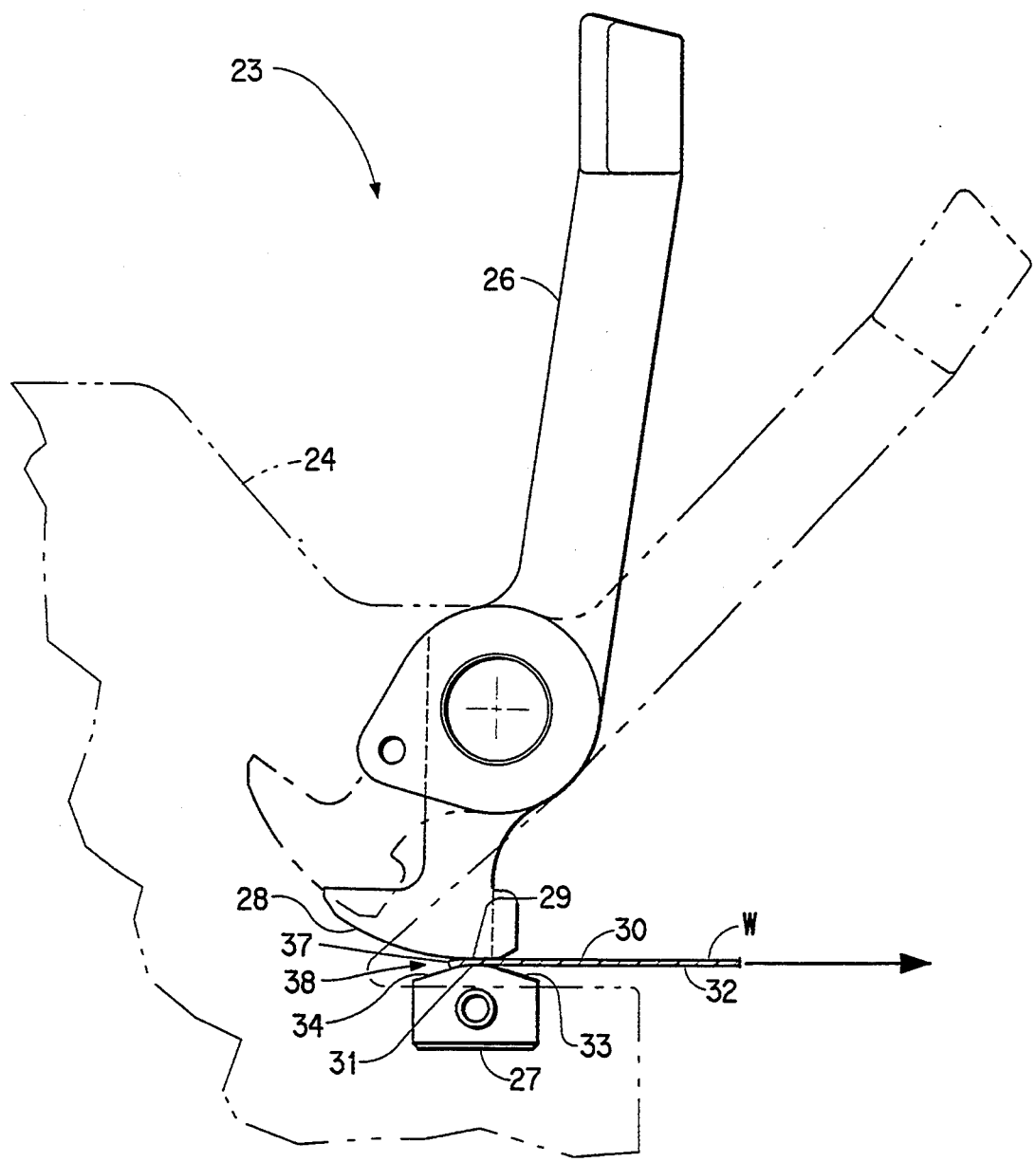
FIG. 3 is a side view of a tenter clip of this invention showing the gripping bead formed at the edge of a film web wedged in a substantially V-shaped gripping region defined by surfaces of the anvil and toggle arm in their gripping positions, as the web is stretched.

Referring specifically to FIG. 1, it will be seen that the film to be oriented by apparatus 10 is supplied from a supply source and moved into a tenter frame, generally designated 11, where it is stretched using the tenter clip of this invention, as shown in greater detail in FIG. 3.

In this instance, a molten polymer is typically melt-extruded through a slit orifice in a hopper 12 and cast onto the quenching surface 13 of an internally cooled rotating quench drum 14 to produce a substantially amorphous self-supporting film in web form W. The web W is stripped from the drum by passing it over a stripper roll 15 and moved onto the tenter frame 11 where it is simultaneously stretched bi-axially in the machine and cross-machine directions to orient it.

As shown in FIG. 2, the web of film is first moved into a heating section 16 in the tenter oven where it is heated by an appropriate heating means 17 to an orientation temperature prior to stretching.

The web W is then moved into a stretching section 18 where it is simultaneously biaxially stretched in the machine and cross-machine directions. The proper film temperature is preferably maintained in this stretching section by using heaters, such as shown at 19.

The web is typically next moved into a heat setting section 20 where it is heat set using an appropriate heat source such as shown at 21. The biaxially stretched film F can then be wound on an appropriate roll 22, for future use, as desired.

More specifically, as the web W is moved into the tenter frame 11, the edges of the web are gripped by opposed pairs of tenter clips having a structure substantially as shown in FIG. 3.

Each of these tenter clips 23 is attached to a carriage 24. The carriages are propelled in endless paths or loops 25 and 25' positioned opposite each other, as shown in FIG. 2.

The two loops are symmetrical, with elements of loop 25 mirrored in loop 25'. The tenter clip carriages are shown as white blocks in a black field, in the two loops. The carriages are propelled along the operational sides of loops 25 and 25' respectively in paired symmetry. That is, the carriages are aligned along a line drawn perpendicular to center line centered between the operational sides of the two loops.

Each loop has a number of portions or sections which define the operational sides and the return sides of the tenter frame. Specifically the first portions of the loops define the heating section 16 where the film is conditioned prior to drawing by heating it to the desired temperature without permitting stretching to occur. The sides of the loops are parellel in this section. The second portions of the loops define the key stretching section 18 of the tenter frame. These portions typically diverge outwardly from a machine centerline for drawing the web in the transverse or cross-machine direction.

Third portions of the loops are connected to the second portions on the forward or operational section of the tenter frame. These portions are opposite each other, equi-distant from the centerline of the frame, and define between them the stabilizing or heat setting section of the apparatus.

These first, second and third portions of the loops define together the operational sides of the tenter frame. The loops are completed on return sides of the frame by fourth portions where the tenter clips are disengaged from the film. The fourth portions connect the first portions to the third portions of the loops to complete the endless paths.

A plurality of carriages 24 are positioned for movement in the elongated loops. The carriages have tenter clips 23 of the type shown in FIG. 3 attached to them, which clips are adapted to grip the edges of the film as it enters the tenter frame and to release the film after it has been moved by the carriages through the operational sides. After releasing the film the carriages are propelled around the return sides of the tenter frame into position to repeat the drawing or stretching operation.

In the stretching section 18, the paths of the clips diverge and opposed pairs of the clips are accelerated causing them to separate and thereby stretch the heated film biaxially in the machine and cross-machine directions.

For further specific details of types of apparatus suitable for stretching film biaxially in accordance with this invention, reference should be made to U.S. Pat. Nos. 4,853,602 to Hommes et al and 3,150,433 to Kampf. The only modification required would be the use of tenter clips of the type shown in FIG. 3. The teachings of these patents are incorporated by reference herein.

The touchstone of this invention resides in the structure of the tenter clip 23, shown in FIG. 3. Referring to this figure it will be seen that such tenter clip comprises two essential parts: a toggle arm 26 and an anvil 27. The toggle arm, which is pivotably connected to the carriage 24, has a curved lower surface 28 a portion of which forms a first gripping surface 29 which is adapted to contact a first upper surface 30 of the web W.

The anvil 27 has a surface facing the curved surface 28 of the toggle arm. A portion of this anvil surface forms a second gripping surface 31 which is adapted to contact a second lower surface 32 of the web and which combines with the first gripping surface 29 of the toggle arm to grip the web W therebetween when the first gripping surface is pivoted into contact with the first upper surface 30 of the web.

The film between these two gripping surfaces stretches during the overall stretching process. This causes the film thickness to be reduced. The gripping mechanisms used for the toggle arm continually adjust the gap between the two gripping surfaces and maintains the gripping force.

In an important aspect of this invention, other portions of the anvil surface are tapered.

More specifically, the anvil 27 has a first tapered surface 33 connected to the second gripping surface 31 extending downwardly and below the body of a web being gripped. The anvil also has a second tapered surface 34 connected to the second gripping surface. This surface also extends downwardly and below the edge of a web being gripped whereby when the web stretches out from under the first and second gripping surfaces, and thereby decreases in thickness, during a web stretching operation, a gripping bead is formed at the edge of web which wedges in a gripping region behind the first and second gripping surfaces to enable the web to be stretched smoothly without undue stress concentrations or film tears in such web during stretching.

The first and second tapered surfaces 33 and 34 of the anvil in a typical embodiment of this invention extend downwardly at an angle of between 5° to 60° from the horizontal. Preferably these tapered surfaces extend downwardly at an angle of about 20° from the horizontal.

Figure 4:
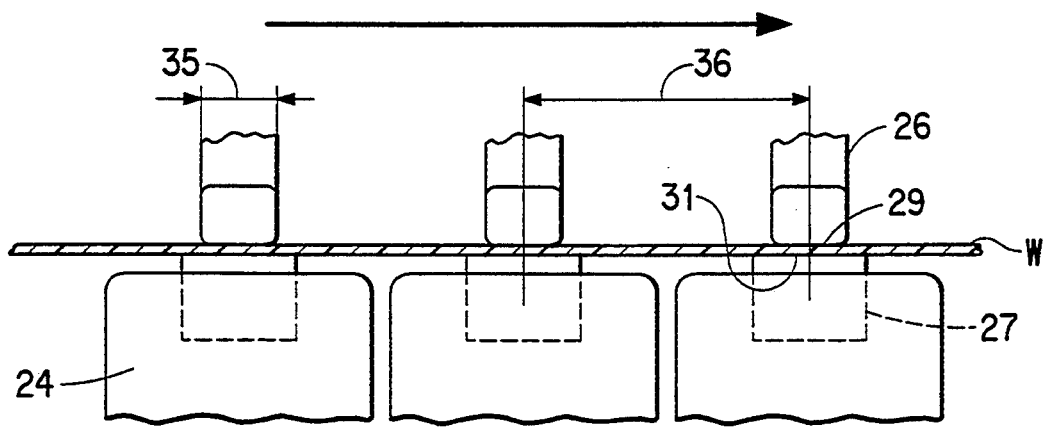
FIG. 4 is a side view showing a plurality of clips moving in the direction of the arrow, and more specifically showing the relationship of the longitudinal dimension of the gripping surface of each clip to the distance between the centers of the clips in accomplishing an effective stretching of a film web.

Further, as best seen in FIGS. 3 and 4, the first and second gripping surfaces 29 and 31 define a web contact area in their web gripping position. The longitudinal dimension of such contact area is such as to permit free longitudinal movement of the web as it is stretched between adjacent clips.

More specifically, when a plurality of spaced apart tenter clips is used to grip a web of sheet material being stretched biaxially in the machine and cross-machine directions during a web stretching operation, the longitudinal dimension 35 of the gripping surface of each clip in the machine direction, as shown by the arrow in FIG. 4, should be less than the distance 36 between the centers of the spaced clips in this direction, prior to stretching. In one embodiment the ratio of the longitudinal dimension of the gripping surface of each clip and the spacing distance between the clips is between 0.1 and 0.6. Preferably the ratio is between 0.2 and 0.35.

The relationship between the spacing between the clips in the machine direction and the length of the gripping area in the same direction is significant. This sets the gap between the gripping points prior to the onset of stretching. If this gap is too small, thin spots and film breaks can occur. The ratio of the length of the gripping area and the spacing between clips should be between 0.1 and 0.6 to insure good performance.

It will be seen that the curved configuration of the toggle arm and tapered surface of the anvil play significant roles in this invention. Together they define the proper dimensions of the first and second gripping surfaces 29 and 31, whereby they are adapted to firmly grip the film during stretching. In this connection it will be seen that the width or transverse dimension of the second gripping surface is considerably reduced because of the taper at its edges when compared to a tenter clip having only a flat anvil surface.

Further, the curved surface of the toggle arm and tapered configuration of the anvil surface function to allow the web to stretch out more freely from between these gripping surfaces during a stretching operation. As the bead 37 forms at the edges of the web during stretching it wedges into the gripping region 38 and this wedging action holds the web in place as the web stretches under the gripping surfaces 29 and 31; otherwise in a biaxial stretching operation the web could pull out completely from under these surfaces. Due to this wedging action the bulk of the stretching forces are carried by the tenter clip thus providing an improved simultaneous stretching operation.

I claim:

1. A tenter clip for use in stretching a web of sheet material in a tenter frame, such web having edges and such clip being attached to a carriage and wherein such clip comprises:

a toggle arm and an anvil, such toggle arm being pivotably connected to the carriage and such anvil being fixedly connected to such carriage, such toggle arm having a curved surface in a machine and cross-machine direction at one end thereof, a portion of which forms a first gripping surface for gripping a first upper surface of such web, such anvil having a surface facing the curved surface of the toggle arm with a portion of such anvil surface forming a second gripping surface for gripping a second lower surface of the web and which combines with the first gripping surface of the toggle arm to grip the web therebetween when the first gripping surface is pivoted into contact with the first upper surface of the web;

wherein the anvil surface has other portions which are tapered; and wherein the curved surface of the toggle arm and tapered configuration of the anvil surface define the first and second gripping surfaces which firmly grip the web while allowing the web to stretch out more freely from between these gripping surfaces during a stretching operation.

2. The clip of claim 1 wherein such anvil has a first tapered surface connected to the second gripping surface extending downwardly and below the body of a web being gripped.

3. The clip of claim 1 wherein such anvil further has a second tapered surface connected to the second gripping surface extending downwardly and below an edge of a web being gripped, whereby when the web stretches out from under the first and second gripping surfaces, and thereby decreases in thickness, during a web stretching operation, a gripping bead is formed at the edge of web which wedges in a gripping region behind the first and second gripping surfaces to enable the web to be stretched smoothly without undue stress concentrations or film tears in such web during stretching.

4. The clip of claim 1 wherein such anvil has a first tapered surface connected to the second gripping surface extending downwardly and below the body of a web being gripped and wherein such taper is at an angle of between 5° to 60° from the horizontal and wherein such anvil further has a second tapered surface connected to such second gripping surface extending downwardly and below the edge of the web being gripped and wherein such taper is at an angle of between 5° to 60° from the horizontal.

5. The clip of claim 1 wherein the first tapered surface of the anvil extends downwardly at an angle of about 20° from the horizontal.

6. The clip of claim 1 wherein the second tapered surface of the anvil extends downwardly at an angle of about 20° from the horizontal.

7. The clip of claim 1 wherein the first and second gripping surfaces define a web contact area in their web gripping position and wherein the longitudinal dimension of such contact area in the machine direction is such as to permit free longitudinal movement of the web as such web is stretched between adjacent clips.

8. A tenter clip for use in stretching a web of film in a tenter frame, such clip being attached to a carriage and wherein such clip comprises:

a toggle arm and an anvil, such toggle arm being pivotably connected to the carriage and such anvil being fixedly connected to such carriage, such toggle arm having a curved surface in a machine and cross-machine direction at one end thereof, a portion of which forms a first gripping surface for gripping a first upper surface of such web, such anvil having a surface facing the curved surface of the toggle arm with a portion of such surface forming a second gripping surface for gripping a second lower surface of the web and which combines with the first gripping surface to grip the web therebetween when such first gripping surface is pivoted into contact with the first upper surface of the web, such anvil further having a first tapered surface connected to the second gripping surface extending downwardly and away from the web being gripped and wherein such taper is at an angle of between 5° to 60° from the horizontal, such anvil further having a second tapered surface connected to the second gripping surface extending downwardly and away from the edge of the web being gripped, and wherein such taper is at an angle of between 5° to 60° from the horizontal; and wherein such second gripping surface as defined by the tapered anvil is adapted to act in combination with the curved first gripping surface of the toggle arm to firmly grip the film and wherein such curved and tapered surfaces of the toggle arm and anvil enable the film to stretch out from under the gripping area as defined by the first and second gripping surfaces; and further act to wedge a bead of the web being gripped in a gripping region behind a wedge point defined by a portion of the curved surface of the toggle arm and the second tapered surface of the anvil, during the stretching operation.

9. A tenter frame for simultaneously stretching a web of thermoplastic film having edges biaxially in a machine and cross-machine direction by propelling carriages with tenter clips attached thereto at varying velocities in endless paths positioned opposite each other, the improvement comprising:

a plurality of tenter clips for gripping the edges of the web during the movement of the web through the tenter frame, each clip consisting of a toggle arm pivotably connected to a carriage and having a curved lower first gripping surface in a machine and cross-machine direction and each clip further having an anvil fixedly connected to such carriage and having an upper second gripping surface with tapered surfaces connected thereto, wherein when the toggle arm is pivoted into contact with a web, an area adjacent the edges of such web is gripped between the upper and lower gripping surfaces, wherein each gripping surface has a longitudinal dimension in the machine direction and each clip has a center; and wherein the longitudinal dimension of the gripping surface of each clip in the machine direction is always less than the distance between the centers of the spaced clips in this direction; and wherein the ratio of the longitudinal dimension of the gripping surface of each clip and the spacing distance between the clips is between 0.1 and 0.6.

* * * * *